UNITED STATES PATENT OFFICE.

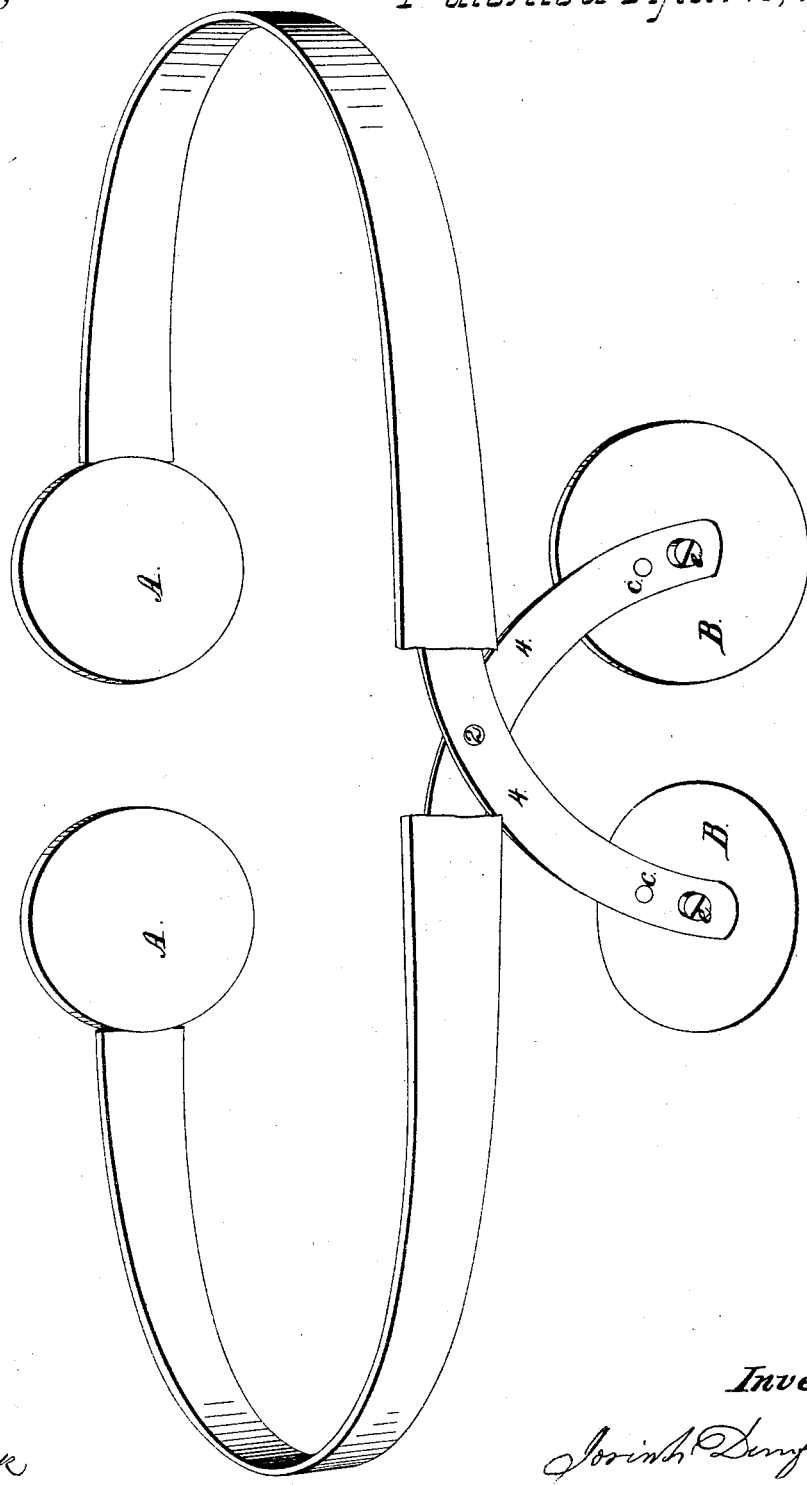

JOSIAH DANFORTH, OF MIDDLETOWN, CONNECTICUT.

HERNIAL TRUSS.

Specification of Letters Patent No. 23,555, dated April 12, 1859.

*To all whom it may concern:*

Be it known that I, JOSIAH DANFORTH, of Middletown, in the county of Middlesex and State of Connecticut, have invented a new and Improved Truss for Hernia; and I do hereby declare that the following is a full and exact description thereof, reference being had to the accompanying drawing and to the letters of reference marked thereon.

The figure is a perspective representation of my truss with letters of reference marked thereon.

My invention consists in the forming of two springs 4 4 so as to fit around the body below the hips which are joined together by screw or rivet at 2 and may be turned on the joint at 2.

To enable others skilled in the art to make and use my invention I will proceed to describe its construction and operation.

I make two springs 4 4 which are shaped so as to fit the body when fastened together by the screw or rivet at 2 this being the front, the springs 4 4 below the screw 2 are bent in a curve downward and at the end of the springs I attach pads B B by screw e e the holes at c c are made so as to change the pads B B when required in fitting the truss. At the opposite end of the springs 4 4 I attach the pads A A, the truss when applied to the body the pads A A rest on the hips each side of the spine which gives support without injury to the spine, the pads B B are so shaped as to fit the rupture and by means of the joint at 2 they can be adjusted with ease, the springs will conform to the motion of the body while the pads B B retain their place, the springs 4 4 are so shaped as to give the pads B B an upward lifting pressure which is a great advantage claimed another great advantage obtained is of having two pads attached when there is but one rupture by giving support to the opposite side and preventing it from being ruptured which is caused many times by a single pad truss.

Having thus fully described my invention I do not claim the crossing of the springs 4 4; but

What I claim as my invention and desire to secure by Letters Patent is—

The uniting by a screw or rivet the two springs 4 4 at a given point 2 from the end of each with pads attached, which can be adjusted to the body without any additional spring, and thereby making the arrangement and combination of the two springs 4 4 with their respective pads a truss of itself.

JOSIAH DANFORTH.

Witnesses:
    JONATHAN BARNES,
    ELI MARTIN.